US012098820B2

(12) United States Patent
Nielsen

(10) Patent No.: US 12,098,820 B2
(45) Date of Patent: Sep. 24, 2024

(54) SPHERICAL MOVING HEAD LIGHT FIXTURE

(71) Applicant: HARMAN PROFESSIONAL DENMARK APS, Aarhus N (DK)

(72) Inventor: Christian Quist Nielsen, Hobro (DK)

(73) Assignee: Harman Professional Denmark Aps, Aarhus N (DK)

( * ) Notice: Subject to any disclaimer, the term of this patent is extended or adjusted under 35 U.S.C. 154(b) by 0 days.

(21) Appl. No.: 18/453,980

(22) Filed: Aug. 22, 2023

(65) Prior Publication Data

US 2024/0060625 A1 Feb. 22, 2024

(30) Foreign Application Priority Data

Aug. 22, 2022 (EP) .................................... 22191439

(51) Int. Cl.

| | |
|---|---|
| ***F21V 14/00*** | (2018.01) |
| ***F21V 14/02*** | (2006.01) |
| ***F21V 21/15*** | (2006.01) |

(52) U.S. Cl.

CPC .............. *F21V 14/02* (2013.01); *F21V 21/15* (2013.01)

(58) Field of Classification Search

CPC ................................. F21V 14/02; F21V 21/15

See application file for complete search history.

(56) References Cited

U.S. PATENT DOCUMENTS

| | | | | |
|---|---|---|---|---|
| 11,241,791 | B1 * | 2/2022 | Ebrahimi Afrouzi .. | G01C 22/02 |
| 2019/0033869 | A1 * | 1/2019 | Herron ................ | A47L 11/4061 |
| 2019/0186720 | A1 * | 6/2019 | Rasmussen .......... | H05B 47/115 |
| 2019/0316762 | A1 | 10/2019 | Rasmussen | |
| 2023/0078347 | A1 * | 3/2023 | Sheldon-Coulson ..... | C25B 1/04 205/637 |

FOREIGN PATENT DOCUMENTS

| | | | |
|---|---|---|---|
| CN | 211011120 | U | 7/2020 |
| JP | 2012006203 | A | 1/2012 |
| JP | WO2010098362 | A1 * | 9/2012 |

* cited by examiner

*Primary Examiner* — Gerald J Sufleta, II

(74) *Attorney, Agent, or Firm* — Artegis Law Group, LLP

(57) ABSTRACT

The invention relates to a moving head light fixture comprising a base and a head having a spherical shape comprising at least an optical system, wherein the base comprises a receiving surface with a concave shape configured to receive the moving head, the base comprising a plurality of omni wheels extending above the receiving surface and configured to provide support surfaces for the moving head, the base comprising at least one control unit configured to control the plurality of omni wheels wherein actuation of at least some of the plurality of omni wheels provide unlimited rotation of the head with three degrees of freedom.

14 Claims, 11 Drawing Sheets

SPHERICAL MOVING HEAD LIGHT FIXTURE

CROSS-REFERENCE TO RELATED APPLICATIONS

This application claims the priority of co-pending European patent application titled "SPHERICAL MOVING HEAD LIGHT FIXTURE," filed on Aug. 22, 2022, and having application number EP 22191439.3. The subject matter of this related application is hereby incorporated herein by reference.

TECHNICAL FIELD

The present application relates to a moving head light fixture and, more particularly, to a light fixture having a base and a moving head.

BACKGROUND

Moving head light fixtures are commonly known in the art of lighting and especially in connection with entertainment lighting. Normally a moving head light fixture comprises a head having a number of light sources creating a light beam and a number of optical components to adapt the light beam and to create various light effects. The head is rotatably connected to a yoke, which is rotatably connected to a base, such that the head can have various degrees of freedom and rotate relative to the base. Generally, the head can move and/or rotate by a certain pan angle and a certain tilt angle relative to the base. However, the degree of freedom for the movement of the head relative to the base is typically limited.

Accordingly a need exists to overcome this drawback and to provide a moving head light fixture having a higher degree of freedom for the movement of the head relative to the base and to have a higher flexibility for replacing the head part.

SUMMARY

This need is met by the features of the independent claims. Further aspects are described in the dependent claims.

The present invention provides a moving head light fixture that has higher degrees of freedom of the head relative to the base. The moving head light fixture further facilitates the replacement of the head.

According to an aspect, a moving head light fixture includes a base and a head having a spherical shape that includes at least one optical system. The base has a receiving surface with a concave shape configured to receive the head. The base furthermore includes a plurality of omni wheels extending above the receiving surface and configured to provide support surfaces for the moving head. The base further includes at least one control unit configured to control the plurality of omni wheels. An actuation of at least some of the plurality of omni wheels provides unlimited rotation of the head with three degrees of freedom.

The moving head light fixture as described above can receive the head having the form of a sphere which is placed on the base and the omni wheels help rotate the head in any of the three rotational directions. The head can be rotated with any yaw angle, any pitch angle, or any roll angle. No fixed mechanical connection is needed between the base and the rotating head. In addition to the higher degrees of rotational freedom, the moving head light fixture has several other advantages, such as enhanced flexibility and convenience of use or the replacement of the head without having to replace the base.

It is to be understood that the features mentioned above and features yet to be explained below can be used not only in the respective combinations indicated but also in other combinations or in isolation without departing from the scope of the present application. Features of the above-mentioned aspects and embodiments described below may be combined with each other in other embodiments unless explicitly mentioned otherwise.

Other advantages will be or will become apparent to one with skill in the art upon examination of the following detailed description when read in conjunction with the accompanying drawings in which like reference numerals refer to like elements.

BRIEF DESCRIPTION OF THE DRAWINGS

The foregoing and additional features and effects of the application will become apparent from the following detailed description.

DETAILED DESCRIPTION

Figure 1:
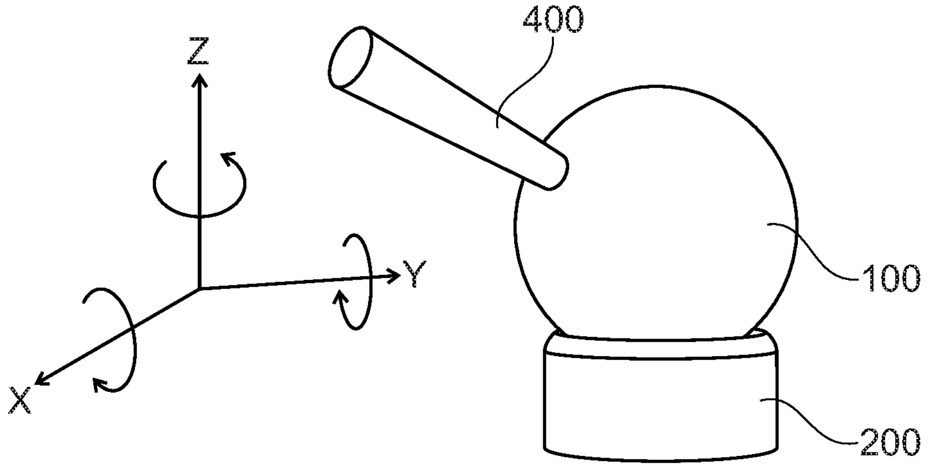
FIG. 1 shows a schematic view of a moving head light fixture including features of the invention.

In the following, embodiments of the invention will be described in detail with reference to the accompanying drawings. It is to be understood that the following description of embodiments is not to be taken in a limiting sense. The scope is not intended to be limited by the embodiments described hereinafter or by the drawings, which are to be illustrative only.

The drawings are to be regarded as being schematic representations, and elements illustrated in the drawings are not necessarily shown to scale. The various elements are represented such that their function and general purpose becomes apparent to a person skilled in the art. Furthermore, any connection or coupling between functional blocks, devices, components of physical or functional units indicated in the drawings and described hereinafter may also be implemented by an indirect connection or coupling. A coupling between components may be established over a wired or wireless connection and functional blocks may be implemented in hardware, software, firmware, or a combination thereof.

In the following, a new moving head light fixture is disclosed that provides three degrees of freedom of the head relative to the base with no mechanical limit. It should be understood that the moving light fixture can contain any optical system which may or may not include a light engine or light-emitting device. Furthermore, the solution discussed below makes the complete system transformable so that a user can easily change the head also called head unit without having to change the base.

FIG. 1 shows a first schematic view of a moving head light fixture incorporating features of the invention. The moving head light fixture comprises a rotating head 100 and a base 200. In the example shown, the head comprises a light emitting device or several light emitting devices to emit a light beam 400. The head 100 is freely rotatable relative to the base 200. As will be explained below in connection with FIGS. 3, 4, 12, and 13, the spherical head can be freely rotated around the X-axis, Y-axis, and Z-axis, and there is no mechanical limitation to the rotational degrees of freedom, as there is no fixed mechanical connection between the base 200 and the head 100.

Figure 2:
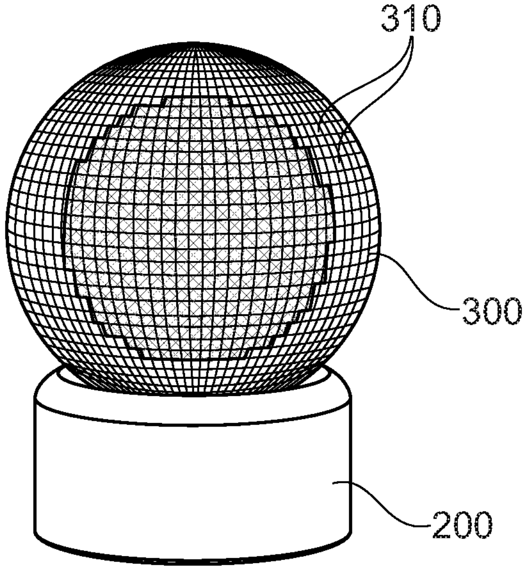
FIG. 2 shows another schematic view of a moving head light fixture including features of the invention.

As indicated above the head 100 may contain a light emitting device, however, it is not necessarily the case. The head comprises at least an optical system, and FIG. 2 shows another embodiment including a moving head light fixture with a base 200 and a head 300. In the example shown in FIG. 2, the head 300 comprises a plurality of different small mirrors 310 as an optical system that are able to reflect the incoming light at a defined angle. Similar to the head 100 of FIG. 1, the head 300 is freely rotatable in any direction.

Figure 3:
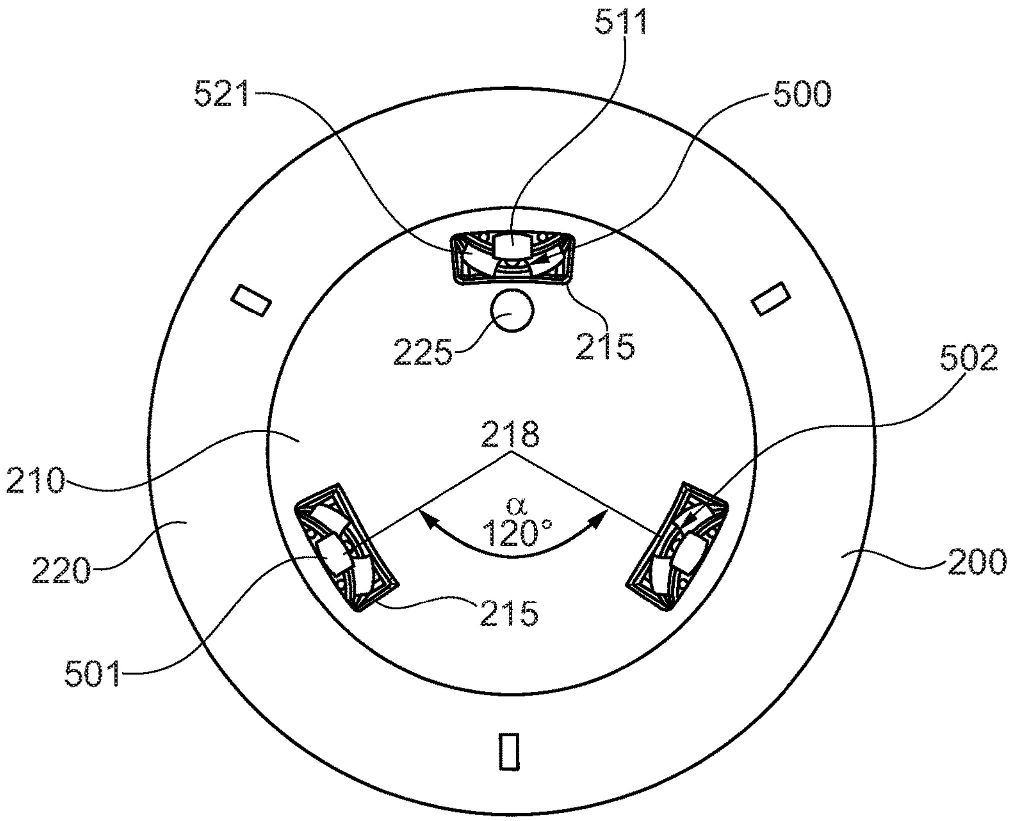
FIG. 3 shows a schematic top view of the base comprising a receiving surface with omni wheels.
Figure 4:
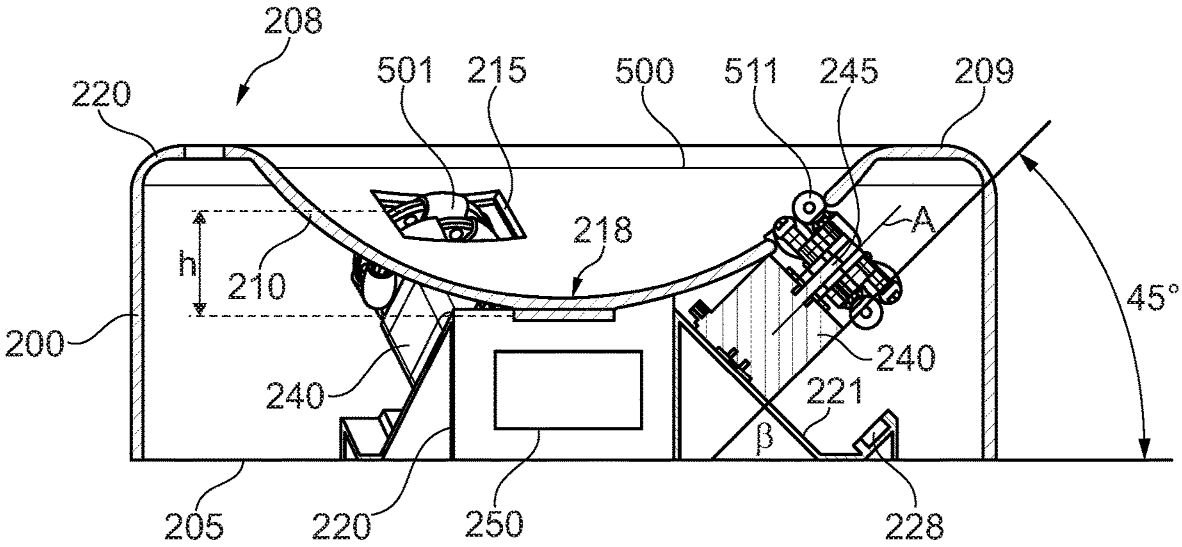
FIG. 4 shows a schematic cross-sectional view of the base shown in FIG. 3.
Figure 17:
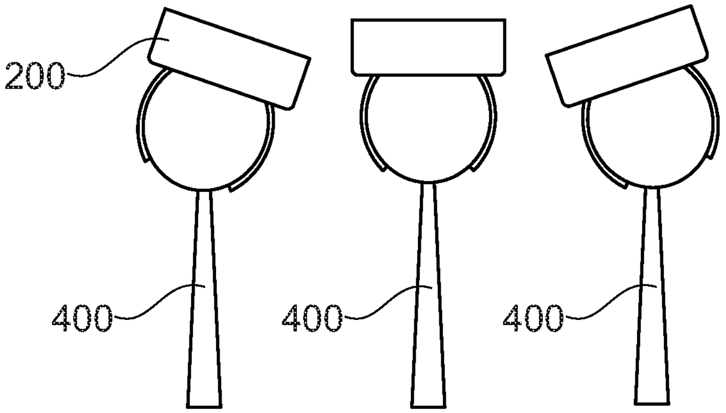
FIG. 17 shows a schematic view of how the moving head light fixture is able to provide a gimbal feature allowing to focus the moving head light fixture a certain point in space independent of a movement and orientation of the base.
Figure 18:
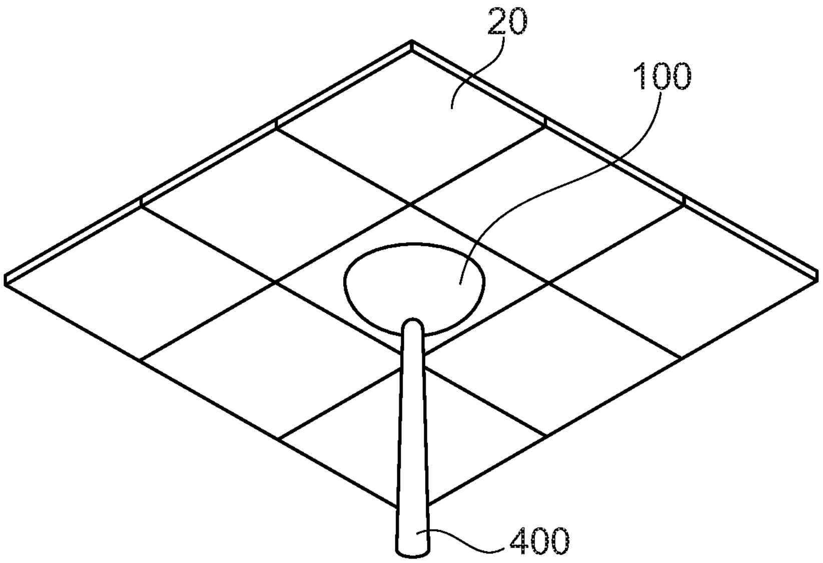
FIG. 18 shows a schematic view of a possible installation of the moving head light fixture in a lower ceiling environment.

With reference to FIGS. 3 and 4, the base 200 is explained in more detail. The base 200 includes a bottom surface 205 and a top surface 208. The base 200 is connected to a support structure (not shown) via the bottom surface 205, wherein different orientations of the base are possible, either an orientation as shown in FIGS. 1 to 12 with the head being on top of the base, or an orientation upside down as shown in FIGS. 17 and 18. Furthermore a vertical orientation of the base 200 and thus of the moving head light fixture is possible in which the bottom surface 205 is parallel to the vertical direction with reference to the earth. Additionally any other angle between a horizontal and vertical orientation of the base 200 is possible. The top surface 208 comprises an outer circumferential edge part 209 parallel to the bottom surface 205 and a receiving surface 210. As shown in FIG. 4, the receiving surface 210 has a concave shape and is adapted to receive a spherical body such as the head 100 or 300. In the receiving surface 210, several openings 215 are provided along a circumference of the receiving surface 210 and an omni wheel 500, 501, 502 is recessed through each of the openings and extends above the surface of the receiving surface 210. Each omni wheel 500 to 502, as explained later in connection with FIG. 5 or 6, contains at least one rotating disk 510 and rotating circumference rollers 511, 521 arranged on the outer circumferential part of the disk 510.

Figure 11:
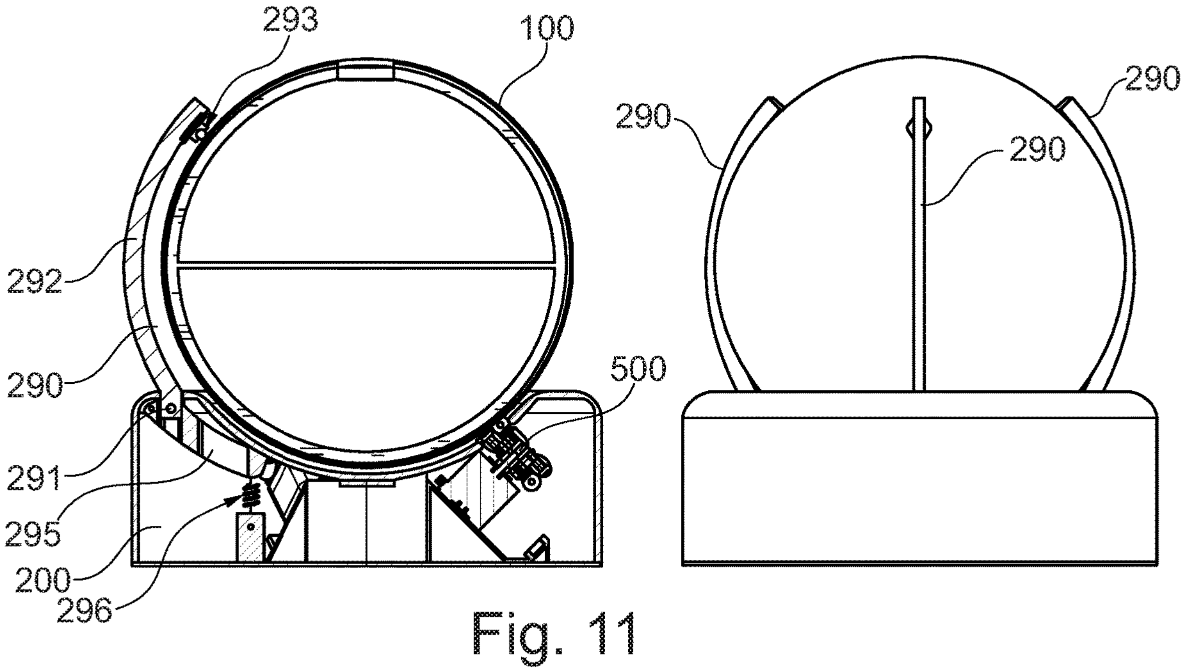
FIG. 11 shows a schematic view of the moving head light fixture comprising a mechanism to secure the head relative to the base.
Figure 12:
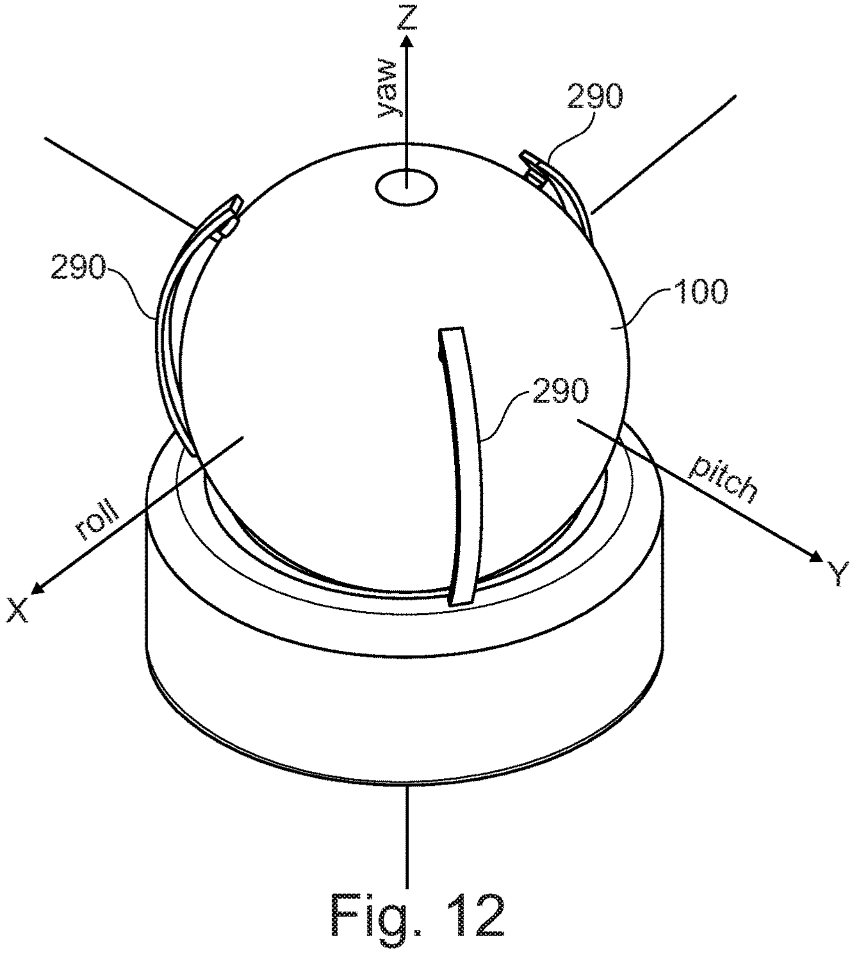
FIG. 12 shows a schematic view of the moving head light fixture of FIG. 11 and the possible axes of rotation.

The bottom surface 205 supports a shroud 220 that contains a control unit 250 used to control the different omni wheels as will be discussed below. Inclined from the shroud 220 there are support legs 221 extending between the shroud 220 and the bottom surface 205 at an angle. Each support leg 221 has a motor 240 mounted thereon. As can be best seen in FIG. 4, the motor is mounted at an angle □ relative to the bottom surface 205. Each motor includes a drive shaft 245 that when actuated by the motor 240 is capable to rotate a corresponding omni wheel 500 to 502 about axis A. As can be best seen in FIG. 4 the drive shaft 245 and the motor are disposed at an angle □ of 45 degree angle relative to the bottom surface 205. FIG. 4 further indicates a one or more mounting elements 228 for locking brackets 290, as shown in FIGS. 11 and 12. The brackets are configured to lock the head 100, 300 on the base 200 when the head is mounted upside down or in any other orientation in which the head is not placed on top of a horizontally placed base as will be explained in connection with FIG. 11.

As indicated above, each omni wheel 500 to 502 is tilted at a 45 degree angle □ relative to the bottom surface 205 of the base 200. The angle □ and the geometry of the shroud with the support legs 221 define a height h of the contact points above a lowest point 218 of the receiving surface 210. It should be understood that other angles or another geometry of the shroud might be used and the position of the openings 215 on the receiving surface might be provided at a smaller or greater height h.

Returning to FIG. 3, a presence sensor 225 can be provided in the receiving surface 210 to detect if the head is present on the base 200 or not. When the sensor such as an infrared range sensor or any other sensor detects that the head is not present on the receiving surface 210, the information about the missing presence could be provided to the control unit 250 which could disable the motors 240 in the base. This can help to avoid injuries at the user of the moving head light fixture due to the rotating omni wheels. The sensor 225 could also be an ultrasonic-based sensor which provides a better protection against dust or dirt build-up on the sensor. Furthermore, more than one sensor 225 could be provided distributed over the receiving surface 210 in order to improve the reliability of the detected result whether the head is placed on the base or not.

Figure 5:
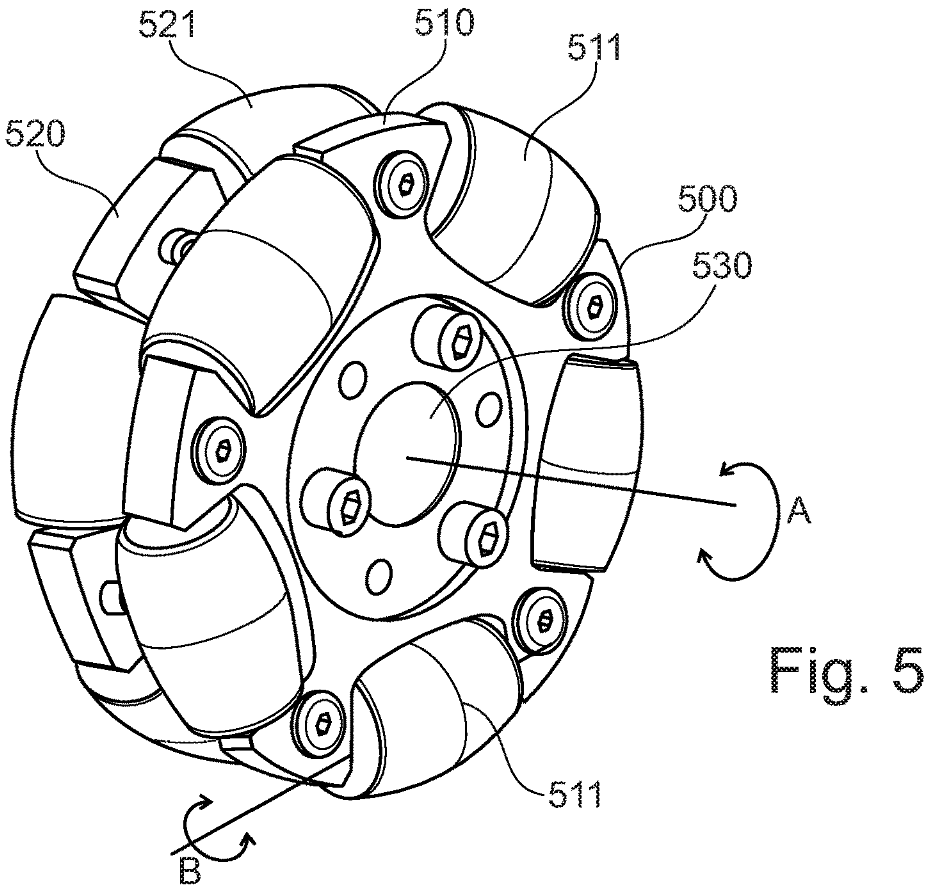
FIG. 5 shows a perspective view of an embodiment of an omni wheel that can be used in the moving head light fixture of FIGS. 1 to 4.

FIG. 5 shows the omni wheel 500 used in the embodiment of FIGS. 3 and 4 in more detail. The omni wheel 500 is a dual ring wheel with two rings or disks 510, 520, which are rotatable as an ensemble around axis A when the drive shaft 245 of the motor 240 shown in FIG. 4 is located in opening 530. Each disk 510, 520 has at its outer circumference rollers 511, 521 having a substantially cylindrical shape which each can freely rotate around an axis through contact points by which the corresponding roller is fixed to the corresponding disk and which is perpendicular to axis A. For one of the rollers this axis is shown in FIG. 5 as axis B. Each motor 240 can control a rotation of the omni wheel 500 as a whole around axis A, whereas the circumference rollers 511, 521 do freely rotate and are not directly driven by a corresponding motor 240.

Figure 6:
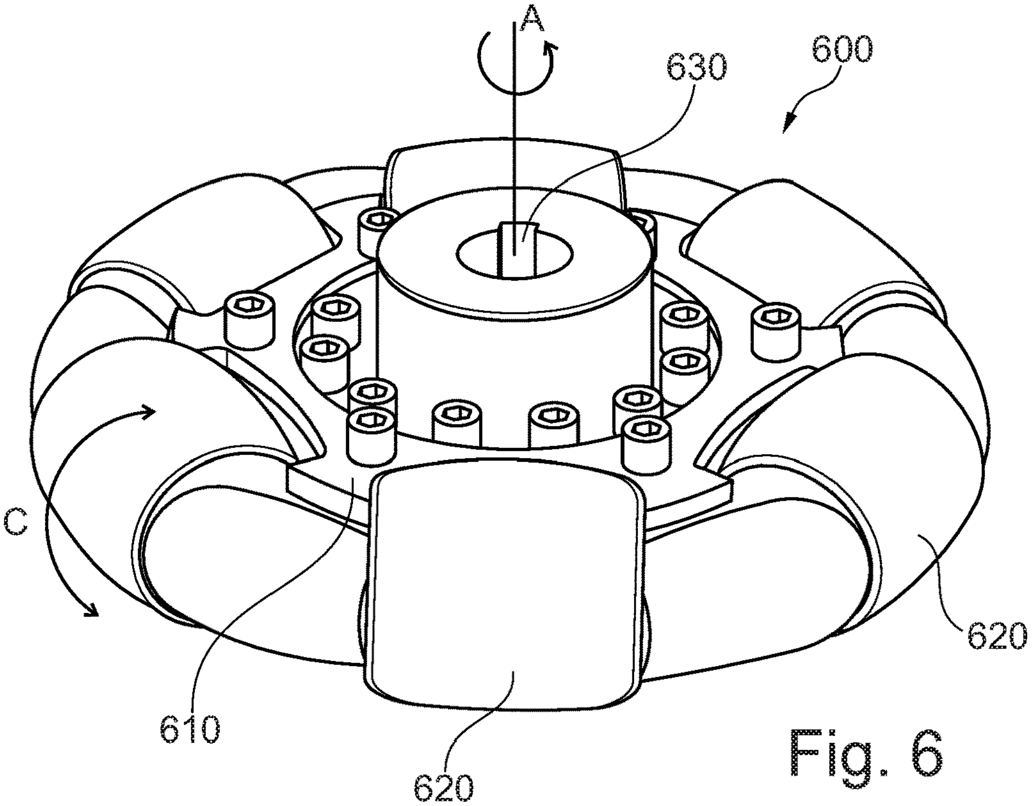
FIG. 6 shows a perspective view of a another embodiment of an omni wheel that can be used in the moving head light fixture of FIGS. 1 to 4.

FIG. 6 shows a further implementation of an omni wheel 600 which can be used instead of the omni wheel 500 shown in FIGS. 3 to 5. The omni wheel 600 contains a single disk 610 and rollers 620. The omni wheel 600 and its rotation around axis A is controlled by the motor 240, and similar to the circumference rollers 511, 521 the rollers 620 freely rotate around an axis perpendicular to axis A as shown by arrow C which indicates the rotation direction.

The omni wheels 500, 600 are holonomic wheels, which can apply forces in the tangential direction of rotation and allow a motion in the perpendicular direction. In FIG. 4, the control unit 250 controls the rotation of the different wheels 500-502. 600.

Figure 7:
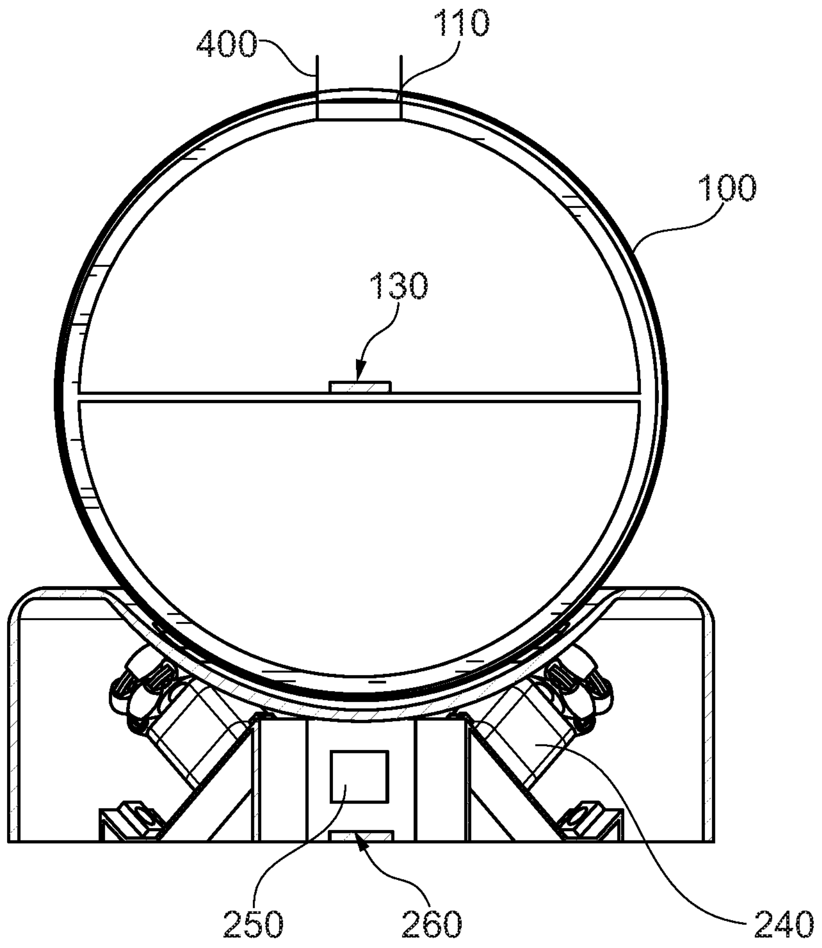
FIG. 7 shows a cross-sectional view of the moving head light fixture when the moving head is placed on the base.
Figure 13:
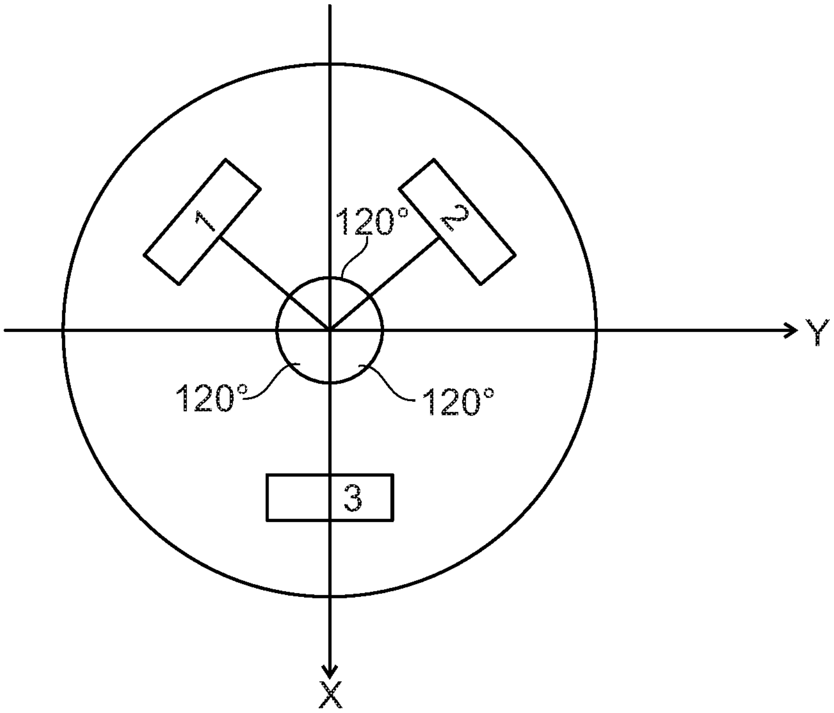
FIG. 13 shows a schematic simplified top view of the base used to explain how the three omni wheels should be activated for a rotation of the head around the different axes.

In connection with FIGS. 7, 12, and 13 it is explained how the control unit 250 can control the rotation of the head 100. The base 200, i.e. the control unit 250 has to have a clear picture of the orientation of the head 100. Furthermore, the angular velocity of the head should be known. To this end the head 100 contains a sensor 130 which can be implemented as inertial measurement unit, IMU, which is able to report a body specific force, the angular rate and the orientation in combination with the acceleration of the head 100. In the same way the base 200 can contain an IMU-sensor 260 as shown in FIG. 7 which is also able to precisely determine the motion and orientation of the base 200. Accordingly, by placing such a sensor in the head 100 and in the base 200 and by a wireless transmission of the senor data from the head to the base, it is possible to closely monitor the orientation and angular velocity of the head 100 relative to the base 200. This furthermore enables the control unit 250 to reset the position of the head 100 during startup and to make alignment corrections during use.

FIG. 12 shows the rotational axes of the head 100, the rotation around axis x, the roll axis, the rotation around axis y, the pitch axis, and the rotation around axis, z, the yaw axis. In order to turn the head by a certain roll, pitch or yaw angle, a mathematical process is used which uses quaternions which represent the desired rotation. The desired rotation direction can be a resulting combination of rotation done on all roll, pitch and yaw axes at the same time or separately. The desired rotation angle is determined by having the wanted rotational position as a input and compare it with the base rotational position and the current rotational position of the head 100. A separate motor scalar matrix can be calculated in relation to the physical size, position and buildup of the omni wheel and the sphere itself.

By using the motor scalar matrix a transformation is done from a desired rotation to a distributed motor speed and rotation direction of the three motors/wheels.

Figure 14:
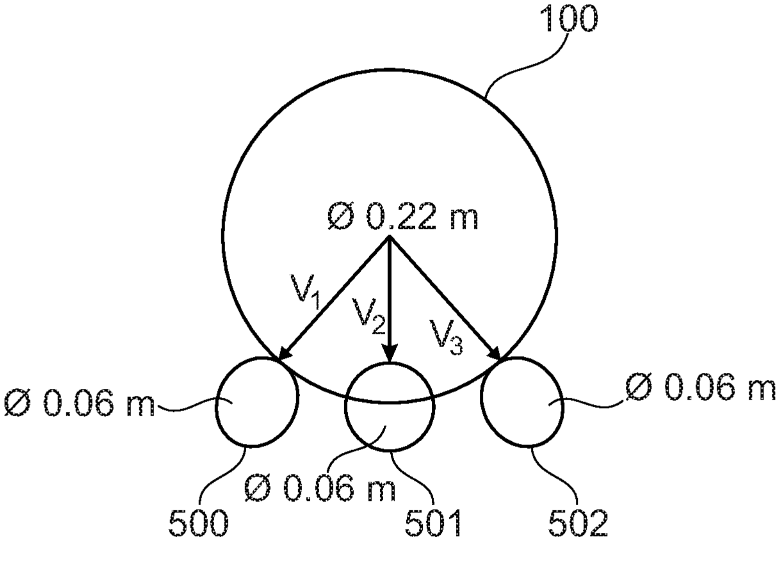
FIG. 14 shows a schematic view of a head of the moving head light fixture contacting the omni wheels at three points that are used for calculating the contribution of each omni wheel to the rotation of the head.
Figure 15:
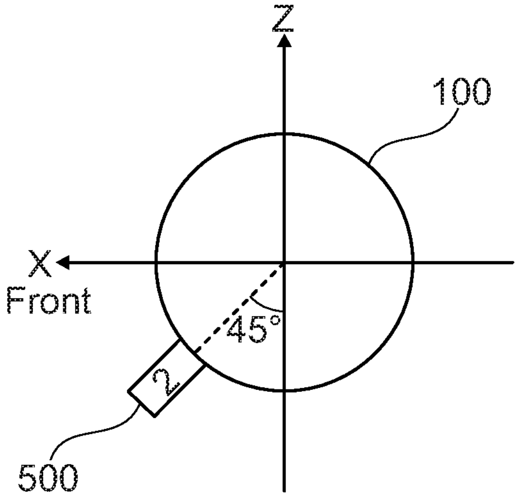
FIG. 15 shows a schematic view of a head of the moving head light fixture contacting one of the omni wheels in a geometry used for calculating the contribution of each omni wheel to the rotation of the head.
Figure 16:
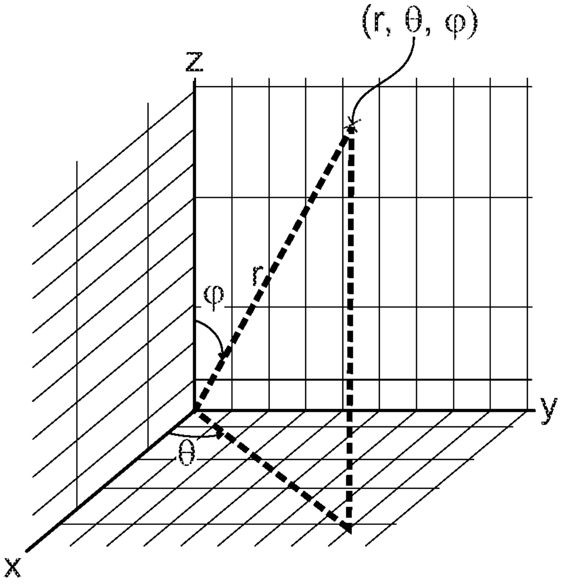
FIG. 16 shows a schematic view of a coordinate system used in the calculation of the contribution of each omni wheel to the rotation of the head.

In connection with FIG. 13 the different motors are numbered as motors 1 to 3 and the following examples show how the different motors 1 to 3 have to be controlled relative to one another for defined rotations. FIG. 14 shows a relationship of head 100, considered as a sphere hereinafter and the contact points to the three omni wheels 500 to 502 and the direction vectors $\overline{v}_1$, $\overline{v}_2$ and $\overline{v}_3$ which indicate a contact point of the head 100 with the corresponding omni wheel. FIG. 15 shows a geometry and angle used in the calculation how the head 100 contacts one of the omni wheels 500 to 502 and in FIG. 16 a coordinate system used in the calculation for converting the calculation from spherical coordinates to Cartesian coordinates is shown.

One possible example for a calculation of the motor scalar matrix is given below:

It is desired to find a relative scaling between the desired rotation about the roll, pitch, yaw axes and the required rotation on each of the three motor axes.

The direction vectors $\overline{v}_1$, $\overline{v}_2$ and $\overline{v}_3$ is found, which indicate each wheel's contact point with the sphere from the sphere's center point. For this calculation, it has been chosen to convert spherical coordinates to Cartesian coordinates, since all angles and the radius to the contact point are known.

$$\overline{v}_1=\begin{bmatrix} r\cdot\cos(\theta)\cdot\sin(\varphi)\\ r\cdot\sin(\theta)\cdot\sin(\varphi)\\ r\cdot\cos(\varphi)\end{bmatrix}=\begin{bmatrix}0.11\cdot\cos(240°)\cdot\\ \sin(135°)\\ 0.11\cdot\sin(240°)\cdot\\ \sin(135°)\\ 0.11\cdot\cos(135°)\end{bmatrix}\approx\begin{bmatrix}-0.038891\\ -0.067361\\ -0.077782\end{bmatrix}$$

$$\overline{v}_2=\begin{bmatrix} r\cdot\cos(\theta)\cdot\sin(\varphi)\\ r\cdot\sin(\theta)\cdot\sin(\varphi)\\ r\cdot\cos(\varphi)\end{bmatrix}=\begin{bmatrix}0.11\cdot\cos(0°)\cdot\\ \sin(135°)\\ 0.11\cdot\sin(0°)\cdot\\ \sin(135°)\\ 0.11\cdot\cos(135°)\end{bmatrix}\approx\begin{bmatrix}0.077782\\ 0\\ -0.077782\end{bmatrix}$$

$$\overline{v}_3=\begin{bmatrix} r\cdot\cos(\theta)\cdot\sin(\varphi)\\ r\cdot\sin(\theta)\cdot\sin(\varphi)\\ r\cdot\cos(\varphi)\end{bmatrix}=\begin{bmatrix}0.11\cdot\cos(120°)\cdot\\ \sin(135°)\\ 0.11\cdot\sin(120°)\cdot\\ \sin(135°)\\ 0.11\cdot\cos(135°)\end{bmatrix}\approx\begin{bmatrix}-0.038891\\ -0.067361\\ -0.077782\end{bmatrix}$$

Where:

$r=0.11\ m$ $0\le\theta\le 2\pi$ $0\le\varphi\le\pi$

The direction vectors are converted to base vectors, so that all direction vectors are equally normalized to find the contribution of each wheel to the movement of the head. This is done by normalizing the direction vectors:

$$\hat{u}_1=\frac{1}{|\overline{v}_1|}\cdot\overline{v}_1=\frac{1}{\sqrt{(v_{1_x})^2+(v_{1_y})^2+(v_{1_z})^2}}\cdot\begin{bmatrix}v_{1_x}\\ v_{1_y}\\ v_{1_z}\end{bmatrix}=\begin{bmatrix}-0.353554\\ -0.612371\\ -0.707108\end{bmatrix}$$

$$\hat{u}_2=\frac{1}{|\overline{v}_2|}\cdot\overline{v}_2=\frac{1}{\sqrt{(v_{2_x})^2+(v_{2_y})^2+(v_{2_z})^2}}\cdot\begin{bmatrix}v_{2_x}\\ v_{2_y}\\ v_{2_z}\end{bmatrix}=\begin{bmatrix}0.707107\\ 0\\ -0.707107\end{bmatrix}$$

$$\hat{u}_3=\frac{1}{|\overline{v}_3|}\cdot\overline{v}_3=\frac{1}{\sqrt{(v_{3_x})^2+(v_{3_y})^2+(v_{3_z})^2}}\cdot\begin{bmatrix}v_{3_x}\\ v_{3_y}\\ v_{3_z}\end{bmatrix}=\begin{bmatrix}-0.353554\\ 0.612371\\ -0.707108\end{bmatrix}$$

The three basic form direction vectors are arranged in a matrix which is multiplied by three scalars roll R, pitch P and yaw Y in each system. Each system is set equal to the unit vector of the axis it represents for roll, pitch and yaw rotation. By solving these systems in terms of the scalars in each system, the relative contribution of each wheel to rotation about each axis is found.

$$\hat{\imath} = \begin{bmatrix} u_{1_x} & u_{1_y} & u_{1_z} \\ u_{2_x} & u_{2_y} & u_{2_z} \\ u_{3_x} & u_{3_y} & u_{3_z} \end{bmatrix} \cdot \begin{bmatrix} R_x \\ R_y \\ R_z \end{bmatrix}$$

$$\hat{\jmath} = \begin{bmatrix} u_{1_x} & u_{1_y} & u_{1_z} \\ u_{2_x} & u_{2_y} & u_{2_z} \\ u_{3_x} & u_{3_y} & u_{3_z} \end{bmatrix} \cdot \begin{bmatrix} P_x \\ P_y \\ P_z \end{bmatrix}$$

$$\hat{k} = \begin{bmatrix} u_{1_x} & u_{1_y} & u_{1_z} \\ u_{2_x} & u_{2_y} & u_{2_z} \\ u_{3_x} & u_{3_y} & u_{3_z} \end{bmatrix} \cdot \begin{bmatrix} Y_x \\ Y_y \\ Y_z \end{bmatrix}$$

Each system is solved in terms of the roll, pitch and yaw scalar vector by inverting the matrix containing the normalized direction vectors:

$$\begin{bmatrix} R_x \\ R_y \\ R_z \end{bmatrix} = \begin{bmatrix} u_{1_x} & u_{1_y} & u_{1_z} \\ u_{2_x} & u_{2_y} & u_{2_z} \\ u_{3_x} & u_{3_y} & u_{3_z} \end{bmatrix}^{-1} \cdot \hat{\imath}$$

$$\begin{bmatrix} P_x \\ P_y \\ P_z \end{bmatrix} = \begin{bmatrix} u_{1_x} & u_{1_y} & u_{1_z} \\ u_{2_x} & u_{2_y} & u_{2_z} \\ u_{3_x} & u_{3_y} & u_{3_z} \end{bmatrix}^{-1} \cdot \hat{\jmath}$$

$$\begin{bmatrix} Y_x \\ Y_y \\ Y_z \end{bmatrix} = \begin{bmatrix} u_{1_x} & u_{1_y} & u_{1_z} \\ u_{2_x} & u_{2_y} & u_{2_z} \\ u_{3_x} & u_{3_y} & u_{3_z} \end{bmatrix}^{-1} \cdot \hat{k}$$

The values are inserted and the scalar results are calculated for each system:

$$\begin{bmatrix} R_x \\ R_y \\ R_z \end{bmatrix} = \begin{bmatrix} -0.353554 & -0.612371 & -0.707108 \\ 0.707107 & 0 & -0.707107 \\ -0.353554 & 0.612371 & -0.707108 \end{bmatrix}^{-1} \cdot \begin{bmatrix} 1 \\ 0 \\ 0 \end{bmatrix} \approx \begin{bmatrix} -0.471404 \\ -0.816498 \\ -0.471404 \end{bmatrix}$$

$$\begin{bmatrix} P_x \\ P_y \\ P_z \end{bmatrix} = \begin{bmatrix} -0.353554 & -0.612371 & -0.707108 \\ 0.707107 & 0 & -0.707107 \\ -0.353554 & 0.612371 & -0.707108 \end{bmatrix}^{-1} \cdot \begin{bmatrix} 0 \\ 1 \\ 0 \end{bmatrix} \approx \begin{bmatrix} 0.942809 \\ 0 \\ -0.471404 \end{bmatrix}$$

$$\begin{bmatrix} Y_x \\ Y_y \\ Y_z \end{bmatrix} = \begin{bmatrix} -0.353554 & -0.612371 & -0.707108 \\ 0.707107 & 0 & -0.707107 \\ -0.353554 & 0.612371 & -0.707108 \end{bmatrix}^{-1} \cdot \begin{bmatrix} 0 \\ 0 \\ 1 \end{bmatrix} \approx \begin{bmatrix} -0.471404 \\ 0.816498 \\ -0.471404 \end{bmatrix}$$

The scalar result is inserted into the motor scalar matrix system below, which can thus be multiplied on the desired normalized axis of rotation from the quaternion, which thus gives a relative output to the three motor speeds to achieve the rotation of the sphere in that direction.

$$\begin{bmatrix} m_1 \\ m_2 \\ m_3 \end{bmatrix} = \begin{bmatrix} R_x & R_y & R_z \\ P_x & P_y & P_z \\ Y_x & Y_y & Y_z \end{bmatrix} \cdot \begin{bmatrix} q_{roll} \\ q_{pitch} \\ q_{yaw} \end{bmatrix} =$$

$$\begin{bmatrix} -0.471404 & -0.816498 & -0.471404 \\ 0.942809 & 0 & -0.471404 \\ -0.471404 & 0.816498 & -0.471404 \end{bmatrix} \cdot \begin{bmatrix} q_{roll} \\ q_{pitch} \\ q_{yaw} \end{bmatrix}$$

The motor output coefficients then describe a relative speed factor, which is needed for a rotation around a defined axis.

By way of example the following motor speed factors are necessary to make a rotation around roll, pitch and yaw. By way of example, in order to obtain the roll rotation, the values −1,0,0 are used in the input column for the q values.

Around Roll=x-Axis:
Motor 1: m1=0.47
Motor 2: m2=−0.94
Motor 3: m3=0.47
Around Pitch=y-Axis:
Motor 1: m1=0.82
Motor 2: m2=0
Motor 3: m3=−0.82
Around Yaw=z-Axis (Out of the Drawing Plane):
Motor 1: m1=0.47
Motor 2: m2=0.47
Motor 3: m3=0.47

FIG. 17 shows how a gimbal feature is obtained with the help of the sensor 130 provided in the head 100 and sensor 260 provided in the base 200. The sensor 260 in the base 200 makes it possible to determine and to take into account the movement in the base 200 itself such that it does not affect the orientation of the light beam 400. By way of example when the base 200 is connected to a support structure (not shown) and the support structure is moving, by way of example due to wind or other factors, the sensor 260 can detect the varying orientation of the base 200 as shown in FIG. 17. When the change in position and orientation of the base 200 is known as detected by the sensor 260, the control unit 250 can adapt the rotation angles of the head in such a way that the same predefined position or location is maintained by the light beam 400 irrespective of the fact whether the base 200 is moving or not. This feature is also known as Gimbal-feature. The sensor 260 in the base can be furthermore used to obtain the orientation of the base to align the calibration with the sensor 130 in the head, especially when the complete moving head light fixture is placed upside down as shown in FIG. 17.

The exchange of the sensor data between the sensor in the base 200 and the sensor in the head 100, especially the transmission of the data from the head to the base occurs in a wireless way. The transmission can be a radio based transmission, however any other transmission technology or communication technology such as a sound based or light based transmission might be used.

Figure 8:
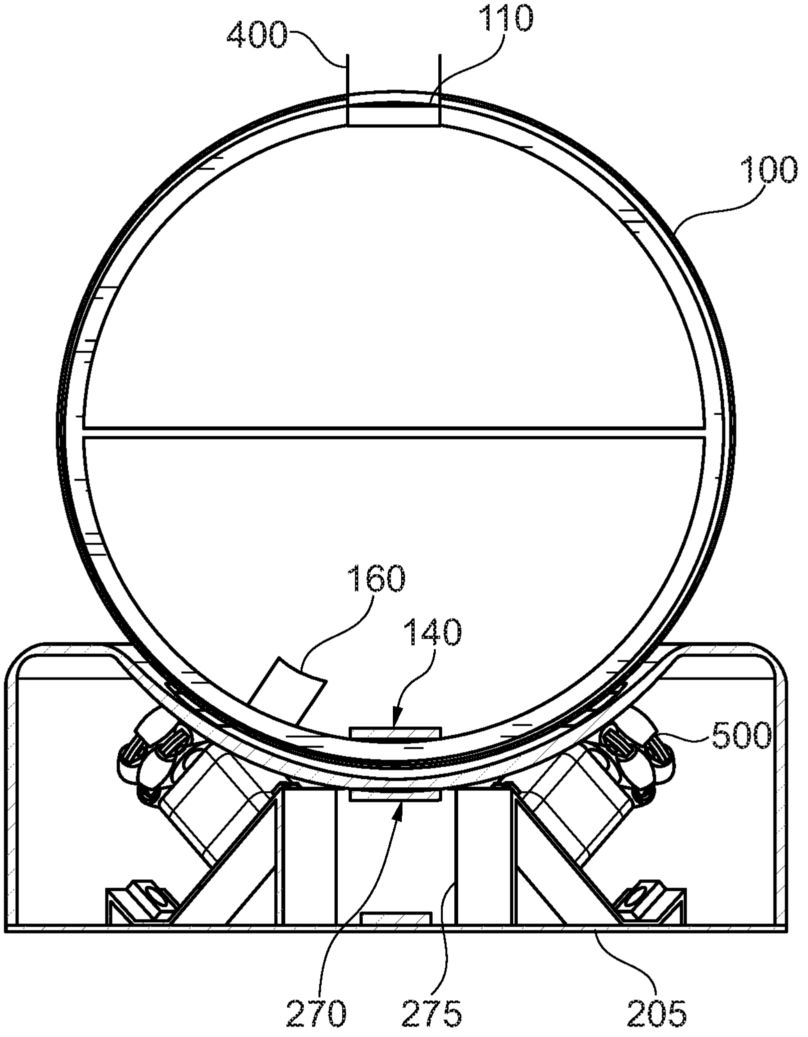
FIG. 8 shows a schematic cross-sectional view of the moving head light fixture including further details of a power supply for the head.

FIG. 8 describes in more detail how a power management in the moving head light fixture might be obtained. The head 100 may include a rechargeable power supply symbolically shown by 160 shown in FIG. 8, whereas the base includes a power supply 275. The rechargeable power supply 160 may be implemented as a battery pack in the head 100. This can make sure that different power needs can be provided to different head units and no physical wire assembly is needed between the head 100 and the base 200. The rechargeable power supply 160 could be recharged by a wireless power transfer, which may be provided by an induction coil 140 provided in the head and by an induction coil 270 provided in the base 200. The power transfer could be based on either an inductive power transfer or a resonant power transfer. If one transmission and one receiving coil is used for coils 140, 270 the alignment of the two coils might also be used to determine a kind of "home position" of the head as shown in FIG. 8. Here, the opening 110 provided for the outlet of the light beam 400 is placed such that the light beam exits the head in a direction perpendicular to the bottom surface 205. It is also possible to use the home position to both charge and power the head at the same time without depleting the rechargeable power supply 160.

Furthermore, it is possible to add an array of transmission induction coils in the base 200 and an array of receiving induction coils distributed over the head surface. This could enable the power transfer in many positions, which could reduce the size of the needed rechargeable power supply 160 provided in the head 100. In case of a distributed wireless power transfer, it is even possible to completely omit the rechargeable power supply 160 in the head 100. This can enable a power transfer in many positions, and can also prolong the operating hours. The base 200 could also utilize a rechargeable power supply and a wireless communication to another power supply outside the base (not shown) to make the product completely mobile. Furthermore, the wireless power transfer could be disabled until it is detected by the presence sensor 225 that the head is placed on the base again.

The data communication from the base 200 to the head 100 can be obtained by a low power wireless communication such as Bluetooth or Wi-Fi. However, it should be understood that a non-radio technology based on light or sound might be used.

Furthermore, it is possible to pair the base 200 and the head 100 when the head is in its center position shown in FIG. 8. The pairing communication could happen over the wireless power induction coils which at the same time ensures that power is provided during the pairing procedure. This enables a simple and secure pairing of the different head and base entities.

Figure 9:
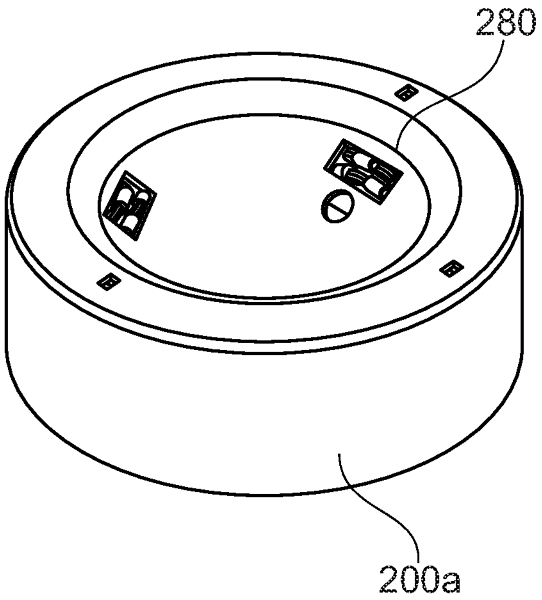
FIG. 9 shows a schematic perspective view of a base including a light emitting surface provided in the receiving surface receiving the head.

Referring to FIG. 9 a further embodiment of a base 200*a* is shown in which the base also contains light emitting devices such as an LED ring which can create an up-light effect onto the head. Accordingly, here the base 200*a* also includes a light-emitting device which is configured to emit light to a light emitting surface 280 provided in the receiving surface. The light emitting surface 280 could be illuminated in any possible color and different effects could be generated such as a pixelated situation where different sections of the light emitting surface 280 are illuminated in different ways. The light emitting surface 280 could be also used to convey information to a user of the light fixture, e.g. could be used to let the user know when the base is correctly aligned relative to the head for an initial wireless pairing or for charging the head. Furthermore text could be displayed on the light emitting surface 280.

The head 100 could also have different outer build-up stacks with transparent or diffused plastics which can be backlit with the light from the light emitting surface 280 or from a light source inside the head. This could light up the whole sphere surface of the head either in a pixelated way or uniformly. Similar to the situation shown in FIG. 2 the head surface could also have a photo luminescent property where patterns on the surface could be created by having UV lights in the base which project light onto the surface of the head so that luminescent patterns could be created in the dark which will slowly disappear on the surface over time.

Figure 10:
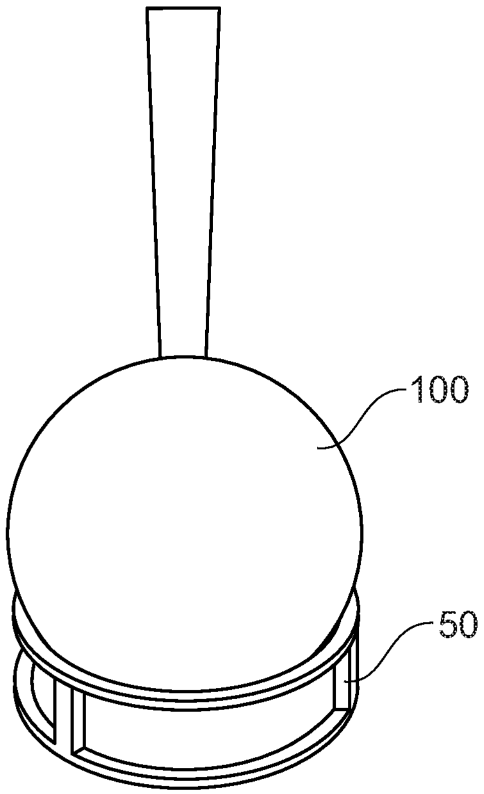
FIG. 10 shows an example schematic view when the head is placed on a support unit working in a stand-alone operating mode without the base.

FIG. 10 shows a situation where the head 100 is used as a stand-alone unit, wherein no mechanism is provided to rotate the head 100. A support structure 50 can be provided to enable a static stand for the head 100, by way of example in a wall wash scenario. Multiple heads 100 might then be connected to a single base which can be placed elsewhere but within a wireless range to control any optical system provided in the head 100.

FIG. 11 shows an example where the moving head light fixture is designed in such a way that it can be hung from a support structure such as a truss. The moving head light fixture includes the head 100 and a base 200. The base 200 corresponds to the base discussed above in connection with FIGS. 3 and 4, but includes several locking brackets 290 connected to the base 200. As shown in the right part of FIG. 11, three different locking brackets 290 may be provided to secure the head 100 on the base 200. As shown in more detail in the left part of FIG. 11, each locking bracket includes a first arm 292 extending above the surface of the base 200 and which contains at its free end a bearing surface 293 where the bracket 290 contacts the head 100. The bearing surface could be implemented as a roller ball bearing. The bracket 290 includes a second arm 295 which is connected to a biasing element or spring 296 which pulls the arm 295 away from the head 100. The brackets 290 can pivot around pivot point 291 and as a consequence the rollerball bearing is pressed against the surface of the head 100. When three evenly distributed locking brackets 290 are used to secure the head 100 on the base 200, a 120° window or surface section of the head is completely free from obstacles. The brackets 290, especially the arm 292 can have a length which makes sure that the head 100 will not fall off when the product is placed upside down. The arm 292 can be opened by a release mechanism not shown so that the head can be placed on the base 200. The mechanism explained above, especially the brackets make sure that enough torque is transferred from the omni wheels to the head when the locking brackets are installed.

FIG. 18 shows a further field of application of the moving head light fixture when the head is placed behind a ceiling 20. The moving head light fixture can be integrated into a lowered ceiling such as ceiling 20 which provides a better visual appearance as the whole base 200 does not need to be free and visible. Only a part of the head 100 could protrude from the ceiling 20 leaving a minimum airgap, and the complete light fixture does not stand out as much as a normal moving head light fixture. Furthermore, one side of the moving head light fixture protruding above the ceiling 20 could be painted in the same color as to ceiling 20 making the product less visible when not in use.

Furthermore in situations where the moving head light fixture is placed outside in a rainy weather it is possible to make the moving head light fixture completely sealed and thereby waterproof and dustproof. This is possible as there is no connection to the head except the wireless power and data transfer. The base 200 can also be completely sealed and the motor shafts could be provided in a waterproof way. In the same way the external data connections for a power connection, an Ethernet connection or XLR connection could also be provided in a waterproof way.

From the above said discussion some general conclusions can be drawn.

The base can comprise a first motion sensor such as a sensor 260 shown in FIG. 5 which is configured to determine the orientation and the angular velocity of the base 200, wherein the head also comprises a motion sensor 130, the second motion sensor which is configured to determine the orientation and angular velocity of the head. The control unit 250 can then be configured to determine the angular position of the head and of the base and preferably the position of the head and the base is based on the signals from at least one of the 2 sensors.

The sensor in the base 200 can also make sure that a gimbal feature is provided. This means that the first motion sensor 260 is configured to determine any movement of the base and the optical system which directs a light beam to a predefined position in space. The beam can be maintained at its position as shown in FIG. 17. The control unit is able, based on the movement of the base 200, to adapt the orientation of the head 100 in such a way that the head continues to direct the light beam to the predefined position irrespective of the movement of the base.

The optical system provided in the head can contain any optical system such as light-emitting devices, by way of example LEDs. Furthermore, the optical system can contain light reflectors, a lens system, color filters etc. Any optical component provided in a moving head light fixture known in the art could be provided in the head 100.

The base can furthermore comprise a power supply 275 configured to provide power to the base and configured for a wireless power transfer to the head 100. Here the power supply 275 in the base could comprise a first induction coil 270 and the head can contain at least a second induction coil 140 as shown in FIG. 8 and the wireless power transfer can be obtained based on at least one of the 2 induction coils.

The control unit 250 can furthermore determine a home position of the head relative to the base based on a position of the at least one first induction coil 270 relative to a position of the at least one second induction coil 140. Furthermore, it is possible that the head comprises a plurality of second induction coils 140 distributed over the sphere and the base 200 can also comprise a plurality of first induction coils 270 distributed over the receiving surface. The power supply can then transfer the power to the head independent of the angular position of the head relative to the base.

The base 200 can furthermore comprise a presence sensor such as sensor 225 shown in FIG. 3, which is configured to determine whether the head 100 is located on the receiving surface 210. When the presence sensor 225 detects that no head is located on the receiving surface, the control unit can be configured to disable an activation of any of the omni wheels.

The base can furthermore comprise a light emitting device configured to emit light to a light emitting surface provided in the receiving surface as shown in FIG. 7 by the light emitting surface 280.

The base can furthermore comprise a plurality of locking brackets 290 connected to the base wherein each of the locking brackets comprises, in proximity of its free, a bearing surface contacting the head when the head is placed on the base. The plurality of locking brackets secure the head on the base independent of the orientation of the base. Each locking bracket can comprise a first arm including the free end with the bearing surface, and a second arm to which the biasing element is connected, wherein the locking bracket is configured to pivot around a pivot point connecting the first and second arm.

The base can comprise the biasing element such as the spring 296 which is configured to bias the bearing surface in direction of the head when the head is located on the base.

There can be three locking brackets which are evenly distributed on the base with an intermediate angle of 120° so that three surface sections are generated on the head between two neighboring locking brackets. The head can furthermore emit an identification signal to the control unit so that the control unit is configured to uniquely identify the head based on the emitted identification signal. As different types of heads may be placed on one base, the identification signal can help to uniquely identify the head and the possible options provided to control the optical system provided in the head.

The above described product has several advantages. First of all the movement of the head is not limited as known in the art where the pan and tilt angle is limited. Furthermore, it is possible to provide a gimbal feature in which a movement of the base is compensated for. It is possible that the base 200 is also battery-powered so that the complete light fixture might be battery-operated. Furthermore, it is easily possible to change the head and pair it with another base. Given three degrees of freedom a 3D tracking system might be provided. It is possible to quickly change the head between a profile fixture, a wash fixture or even a beam fixture. Accordingly, a high flexibility is obtained in a touring or a staged environment. The head could easily be swept out creating a different look between different bands but at the same time keeping the change time down to a minimum. The base can be kept with its power and data cable connections plugged in. Furthermore a more appealing installation in a lowered ceiling environment is possible as shown in FIG. 11. Furthermore, it is possible to make the complete product waterproof so that it might be used in an outdoor environment.

What is claimed is:

1. A moving head light fixture comprising:

a base;

a head having a spherical shape comprising at least an optical system; and a plurality of locking brackets connected to the base, wherein each of the locking brackets comprises, in proximity of a free end a bearing surface configured to contact the head, the plurality of locking brackets securing the head on the base;

wherein:

the base comprises a receiving surface with a concave shape configured to receive the head;

the base comprises a plurality of omni wheels extending above the receiving surface and configured to provide support surfaces for the head; and the base comprises at least one control unit configured to control the plurality of omni wheels, wherein actuation of at least some of the plurality of omni wheels provide unlimited rotation of the head with three degrees of freedom.

2. The moving head light fixture of claim 1, wherein:

the base comprises a first motion sensor configured to determine an orientation and an angular velocity of the base;

the head comprises a second motion sensor configured to determine an orientation and an angular velocity of the head; and the control unit is configured to determine an angular position of the head on the base taking into account signals from at least one of the first and second motion sensors.

3. The moving head light fixture of claim 2, wherein:

the first motion sensor is configured to determine any movement of the base;

the optical system comprises at least one light emitting device configured to direct a light beam to a predefined position in a space surrounding the moving head light fixture; and the control unit is configured, based on the movement of the base, to adapt the orientation of the head such that the head continues to direct the light beam to the predefined position irrespective of the movement of the base.

4. The moving head light fixture of claim 1, wherein the optical system comprises at least one of a light emitting device, a light reflector, a lens system, or a color filter.

5. The moving head light fixture of claim 1, wherein the base comprises a power supply configured to provide power to the base and configured for a wireless power transfer to the head.

6. The moving head light fixture of claim 5, wherein:

the power supply in the base comprises at least one first induction coil;

the head comprises at least one second induction coil; and the wireless power transfer is obtained based on the at least one first induction coil and the at least one second induction coil.

7. The moving head light fixture of claim 6, wherein the control unit is configured to determine a home position of the head relative to the base based on a position of the at least one first induction coil relative to a position of the at least one second induction coil.

8. The moving head light fixture of claim 6, wherein:

the head comprises a plurality of second induction coils distributed over the head, the base comprises a plurality of first induction coils distributed over the receiving surface; and the power supply is configured to transfer power to the head independent of an angular position of the head relative to the base.

9. The moving head light fixture of claim 1, wherein:

the base comprises a presence sensor configured to determine whether the head is located on the receiving surface; and when the presence sensor detects that no head is located on the receiving surface, the control unit is configured to disable an actuation of any of the plurality of omni wheels.

10. The moving head light fixture of claim 1, wherein the base comprises a base light emitting device configured to emit light to a light emitting surface provided in the base.

11. The moving head light fixture of claim 1, wherein the base comprises a biasing element configured to bias the bearing surface in a direction of the head when the head is located on the base.

12. The moving head light fixture of claim 11, wherein each locking bracket comprises:

a first arm including the free end with the bearing surface; and a second arm to which the biasing element is connected;

wherein the locking bracket is configured to pivot around a pivot point connecting the first arm and the second arm.

13. The moving head light fixture of claim 1, wherein the plurality of locking brackets comprises three locking brackets which are evenly distributed on the base with an intermediate angle of 120° such that three surface sections are generated on the head between two neighboring locking brackets.

14. The moving head light fixture of claim 1, wherein:

the head is configured to emit an identification signal received by the control unit of the base; and the control unit is configured to uniquely identify the head based on the emitted identification signal.

* * * * *